Aug. 1, 1950 A. FROMAGEOT 2,516,862
FREQUENCY AND PHASE MODULATION
Filed Sept. 5, 1947
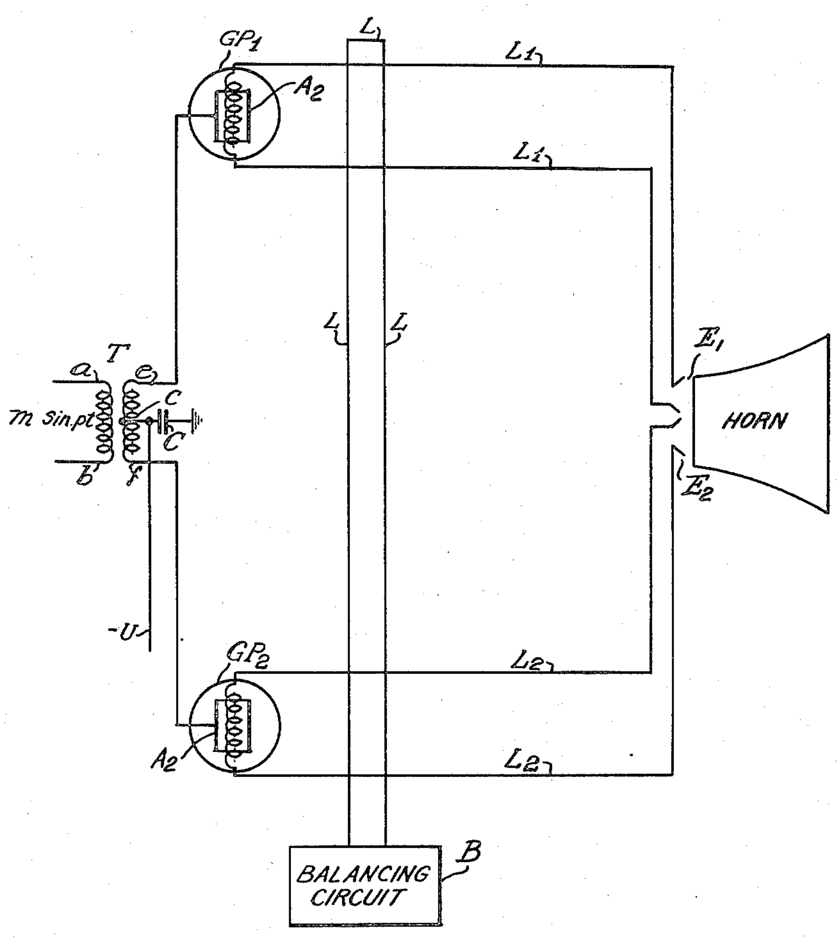
INVENTOR.
ANTOINE FROMAGEOT
BY Robert Harding Jr.
ATTORNEY Patented Aug. 1, 1950

2,516,862

UNITED STATES PATENT OFFICE 2,516,862

FREQUENCY AND PHASE MODULATION

Antoine Fromageot, Paris, France, assignor to International Standard Electric Corporation, New York, N. Y., a corporation of Delaware Application September 5, 1947, Serial No. 772,403
In France February 15, 1946

Section 1, Public Law 690, August 8, 1946
Patent expires February 15, 1966

6 Claims. (Cl. 332—24)

This invention relates to apparatus for frequency modulation and particularly to such apparatus used for frequency changing.

An object of this invention is to improve the efficiency of phase or frequency modulated transmitters.

Another object of the invention is to provide apparatus to obtain this increase in efficiency wherein phase or frequency modulation is accomplished in push-pull circuits.

Another object of the invention is to provide apparatus for suppressing the carrier frequency and given order component frequencies in the spectrum of the transmitted frequencies.

Previously, apparatus for changing frequency at centimeter wavelengths has consisted of frequency modulators for frequency modulating an oscillator operating at centimeter wavelengths. In such previous systems, if the modulating frequency or signal to be transmitted is $$\frac{P}{2\pi}$$

and the frequency of oscillation of the oscillator to be modulated is $$\frac{\theta}{2\pi}$$

the amplitude of the modulated signal can be shown by the formula $$A \sin (\theta t + m \sin pt)$$

where A is a constant, $t$ is time and $m$ is the modulation index.

This formula may be decomposed, by known methods, to its equivalent:

$$A\{J_0(m) \sin \theta t + J_1(m)[\sin (\theta+p)t - \sin (\theta-p)t] + J_2(m)[\sin (\theta+2p)t + \sin (\theta-2p)t] + \dots , , ,$$

where $J_k$ is the Bessel function of $k^{th}$ order. This formula possesses an infinite number of terms as shown by the dotted continuation symbols according to accepted mathematical usage. By transmitting only given order sideband components, as for example the frequency $$AJ_1(m) \sin (\theta+p)t$$

and eliminating all the other frequencies in some way. One sees that angle modulation, that is frequency or phase modulation, of the carrier frequency $$\frac{\theta}{2\pi}$$

by the modulating frequency $$\frac{p}{2\pi}$$

permits the transmission of intelligence by selected given order component sidebands of the transmitted energy. Previous systems have not allowed the transmission of only this one frequency but have included all the other frequencies, each indicated by a term in the foregoing series. In such previous systems the efficiency can be shown to be $$\frac{J_1^2(m)}{J_0{}^2 2(m) + 2J_1^2(m) + 2J_2^2(m) + \dots} = J_1^2(m)$$

according to known formulas. This efficiency is maximum when the modulation factor $m$ is equal to 1.85 when the efficiency as determined by the above formula is 34%.

According to the invention herein described, two oscillators are frequency or phase modulated, the outputs of the two oscillators being in phase opposition in order to obtain a frequency change greater than that formerly obtained.

The signals emitted by the two oscillators which are modulated in phase opposition are respectively of the following forms:

$$A \sin (\Omega t + m \sin pt)$$
$$A \sin (\Omega t - m \sin pt)$$

The mathematical form of these two are the same for both frequency and phase modulation.

If one decomposes these signals into their sinusoidal components, one obtains the two spectrums of frequency. For the first signals, the development in series is expressed by means of Bessel function of the first kind designated by $$J_n(m)$$

in which case the letter $n$ gives the order:

$$A\{J_0(m) \sin \Omega t + J_1(m)[\sin (\Omega+p)t - \sin (\Omega-p)t] + J_2(m)[\sin (\Omega+2p)t - \sin (\Omega-2p)t] + \dots + J_m(m)[\sin \Omega+np)t + (-1)^m \sin (\Omega-np)t] + \dots]$$

For the second signal, the development is analogous if one notes that:

$$J_n(m) = +J_n(-m)$$

if $n$ is even and $$J_n(m) = -J_n(-m)$$

when $n$ is odd. The second signal has therefore the form $$A\{J_0(m)\sin\Omega t - J_1(m)[\sin(\Omega+p)t - \sin(\Omega-p)t$$
$$+\dots$$
$$+(-1)^m J_n(m)[\sin(\Omega+mp)t + (-1)^m \sin(\Omega-mp)t]$$
$$+\dots$$

If one recombines these two signals the resulting signal conserves only the odd indicial coefficients as follows:

$$A\{2J_1(m)[\sin(\Omega+p)t - \sin(\Omega-p)t]$$
$$+2J_3(m)[\sin(\Omega+3p)t - \sin(\Omega-3p)t]$$
$$+\dots$$
$$+2J(m)[\sin(\Omega+(2n+1)t - \sin(\Omega-(2n+1)p)t$$
$$+\dots$$

Take for example the case of $m=2$. One knows from the tables of Bessel functions that they will take the following values:

$J_1(2)=.577$
$J_3(2)=.309$
$J_5(2)=.034$
$J_7(2)=.0012$

The energy used for transmission is proportional to $$4J_1^2(2)$$

The total energy used is approximately $$2(4J_1(2)+4J_3^2(2)+-\dots)$$

The energy efficiency of frequency changing is then $$\frac{4J_2^2(2)}{2(4J_1^2(2)+4J_3^2(2)+\dots} = \frac{J_1(2)}{2(J_1^2(2)+J_3^2(2)+\dots} = .475$$

In order to make a comparison with the value of 34% obtained above the ratio of the two values is now $$\frac{.475}{.340} = 1.40$$

One obtains therefore energy efficiency 40% higher than that which one would have had by means of simple frequency modulation.

In practice, in the case where one is limited by the non-linearity of the frequency voltage curve of the modulated generator, the improvement can be even greater due to the fact that the double modulation of frequency and phase opposition cancels out certain components of the signal over its side band frequencies, this cancelling being less extended than in the case of simple modulation and thus limits the operation of modulation to the domain where the characteristic of the frequency voltage curve of the centimetric wave generators is more linear.

One object of the present invention is to improve the efficiency in a transmitter utilizing phase or frequency modulation as a means of frequency changing.

Another object is to furnish apparatus for obtaining this improvement utilizing push-pull arrangements in the phase or frequency modulators.

According to one of the characteristics of the present invention, two high frequency oscillators oscillate synchronously. According to another characteristic, the two oscillators are frequency or phase modulated, the modulations being in opposition.

According to another characteristic, the emission of a product of modulation is made in opposition which has for results to cancel out in the spectrum of the transmitter the side bands of even order including the carrier frequency.

Other characteristics will appear in the following description and example of the present invention in relation with the attached drawing which represents the circuit.

The example described utilizes oscillators constituted by special positive grid tubes in which the grid is maintained positive with respect to plates as for example oscillators of the Barkhausen type.

The modulation is applied to the two terminals *a* and *b* of the transformer T. On the drawing, the mathematical symbol ($m \sin pt$) indicates this modulation.

The secondary of the transformer has a center terminal *c*. On this center terminal is placed a potential −U. In the realization of the present invention described, this potential is negative with respect to the grid of the oscillators $GP_1$ and $GP_2$ which are the oscillators having positive grids.

On the same center tap *c* is placed a condenser of large capacity C which is in turn connected to the ground.

The potentials at the point *e* and *f* of the transformer are in phase opposition because of the grounding by condenser C. That is, if at point *e* one has the potential $m \sin pt$, one has at *f* a potential $-m \sin pt$.

The two points *e* and *f* are respectively connected to anodes $A_1$ and $A_2$ of oscillators $GP_1$ and $GP_2$. These two oscillators oscillate at equal mean frequencies.

The output of these oscillators is composed of two lines $L_1$ and $L_2$ which leads to two antennas $E_1$ and $E_2$. The emission is concentrated by a horn P. The lines $L_1$ and $L_2$ receive the products of modulation, that is to say, the signals at $L_1$: $A_1 \sin(\Omega t + m \sin pt)$
at $L_2$: $-A_1 \sin(\Omega t - m \sin pt)$ The oscillators are mounted symmetrically. The signals are in opposition and consequently the products of modulation cancel out to a degree as described above. As it has been shown above by the mathematical development, the side bands of odd order only are conserved by this system.

To assure the synchronization of the two oscillators, a line L is provided. This line is balanced. On the drawing there has been shown at B the balancing circuit. The coupling of line L with lines $L_1$ and $L_2$ cause the signals $$A_1 \sin(\Omega t + m \sin pt) \text{ and } A_1 \sin(\Omega t - m \sin pt)$$

within L to add. By development analogous to that which has been made for the signals in opposition, it is possible to show that in this case the side bands of even order and the carrier frequency only are conserved.

The presence of the even order bands and the carrier assure the coupling and the synchronization of the two oscillators and it has been found that this synchronization is sufficient.

It is clear that the present invention has been described in relation with a particular example and that it is not limited to said example but it is susceptible of many modifications without departing from the domain of the invention. Notably, the oscillators can be replaced by any type of known oscillators, the frequency modulation can be replaced by phase modulation.

I claim:

1. An angle modulation system comprising a source of carrier frequency energy, a source of modulating frequency energy, means for simultaneously angle modulating said carrier frequency energy with modulating frequency energy of given phase and of a phase opposite to said given phase to obtain separate modulated outputs, means for combining said separate modulated outputs whereby given order sideband components of said separate modulated outputs are suppressed, said carrier frequency energy source comprising two separate oscillators operating at the same carrier frequency, means for separately modulating the carrier frequency energy of each of said oscillators with modulating frequency energy of opposite phase to obtain separate modulated outputs, each of said oscillators comprising an electron discharge device having cathode, grid and plate electrodes, means for operating each of said plate electrodes at a negative potential with respect to its respective grid electrode, and means for applying said modulating frequency energy in push-pull to the plate electrodes of said devices, whereby separate modulated outputs are provided at the respective grid electrodes.

2. An arrangement according to claim 1, wherein said means for combining comprises separate radiant acting elements coupled to respective grid electrodes.

3. An arrangement according to claim 2, wherein each of said radiant acting elements comprises radiators for transmitting each of said separate modulated outputs, said given order sideband components of said separate outputs cancelling one another after radiation.

4. An arrangement according to claim 3, further comprising means for applying a portion of said separate outputs to said carrier frequency source for stabilizing said carrier frequency source.

5. An angle modulation system comprising two separate oscillators operating at the same carrier frequency for providing carrier frequency energy, a source of modulating frequency energy, means for separately and simultaneously modulating the carrier frequency energy of each of said oscillators with modulating frequency energy of opposite phase to obtain separate modulated outputs, means for combining said separate outputs to suppress even order sideband components of said separate outputs; a circuit for combining a portion of said two separate outputs to suppress odd order sideband components in said circuit, and means for coupling said circuit to said oscillators for synchronizing the carrier frequency of said two oscillators.

6. An arrangement according to claim 5, wherein said means for separately modulating comprises a modulation transformer operated in push-pull for modulating said two oscillators with modulating frequency energy of opposite phase.

ANTOINE FROMAGEOT.

REFERENCES CITED

The following references are of record in the file of this patent:

UNITED STATES PATENTS

| Number | Name | Date |
|---|---|---|
| 2,078,245 | Hollmann | Apr. 27, 1937 |
| 2,279,660 | Crosby | Apr. 14, 1942 |
| 2,301,907 | Pieracci | Nov. 10, 1942 |
| 2,326,314 | Usselman | Aug. 10, 1943 |
| 2,335,934 | Goldstine | Dec. 7, 1943 |
| 2,426,996 | Goodall | Sept. 9, 1947 |
| 2,436,834 | Stodola | Mar. 2, 1948 |